UNITED STATES PATENT OFFICE.

FREDERIC A. EUSTIS, OF MILTON, MASSACHUSETTS.

TREATMENT OF NICKEL ORES.

1,212,334.  Specification of Letters Patent.  Patented Jan. 16, 1917.

No Drawing.  Application filed August 24, 1915.  Serial No. 47,161.

*To all whom it may concern:*

Be it known that I, FREDERIC A. EUSTIS, a citizen of the United States, and resident of Milton, in the county of Norfolk and State of Massachusetts, have invented new and useful Improvements in the Treatment of Nickel Ores, of which the following is a specification.

This invention relates to a process for the extraction or recovery of nickel from its ores, and particularly to the extraction of nickel by what may be termed the wet method, that is, by getting the nickel into solution and precipitating it from such solution.

The invention is adapted to the treatment of ores containing nickel and other metals, especially iron, and one of its objects is not only to recover the valuable nickel for its own sake, and incidentally other metals or substances of value which are present in the ore with the iron, but also when used with an iron ore to purify and improve the iron ore. The process is especially though not exclusively applicable to the treatment of such ores as the soft iron ores of the north coast of the island of Cuba, which occur as blanket deposits on top of the rocks forming that part of the island. These ores consist essentially of oxids or oxids and silicates of iron and alumina, and contain also small amounts of the metals chromium, manganese and nickel, together with much water.

In carrying out my invention I recommend the following steps: First, subject the ore to a preliminary heat treatment, preferably consisting of a sulfating roast. The heating step (roasting) is to be carefully distinguished from smelting. The effect of such roasting is to render the nickel in the ore more soluble. Even without this preliminary heat treatment, I have found that much nickel can be taken into solution by ordinary solvents, but that more nickel can be taken into solution with less expensive solvents by first subjecting the ore to the preliminary heat treatment. With the particular ore above referred to I have found that the heat treatment which is most desirable consists in a sulfating roast at a moderate temperature, conducted in a muffle, such as would be obtained in practice in an ordinary shelf roaster. Good results may be had by adding to the ore 5% to 10% of its weight of sulfur bearing material such as pyrite, and roasting at a temperature of about 460° C. for a period of about four hours. I have found that either a fairly long heat treatment under the above conditions, or a very short treatment at a higher temperature, will give better results than intermediate conditions. For example, I have obtained good results by roasting for a period of four to six hours at a temperature of 460° C., or for a period of one-quarter to one-half an hour at a temperature of 500° C.; but the results are not as good with intermediate conditions. Under this heat treatment relatively large amounts of nickel and alumina are made into sulfates, while a relatively small amount of the iron is made into sulfate. The preliminary heat treatment also affects the amount of iron which will be taken into solution. Without any such heat treatment a large amount of iron would be dissolved by a strong solvent, while said roasting process will give a substantial amount of soluble nickel with relatively little soluble iron, and so almost entirely prevent the solution of the iron. After said preliminary heat treatment the product of the roast is subjected to a leaching treatment. The best solvent which I have discovered for the nickel in the ore is sulfuric acid. Considerable amounts of nickel can be taken into solution in pure water, after the ore has been subjected to said heat treatment, but more can be taken into solution in dilute sulfuric acid. A solvent consisting of one-half of one per cent. sulfuric acid and seven per cent. hydrochloric acid is also very efficient. Obviously, the less acid used in the solution, the less limestone will be consumed in the succeeding steps of the process. With water or dilute acid the nickel will readily go into solution. I also recommend using the solvent boiling hot, that is, at a temperature of 100° C., whereby very little of the iron is dissolved, since iron is less soluble in a hot solution, whereas nickel and alumina are more soluble.

Instead of first roasting and then subjecting the material to a solvent, good results may be obtained by moistening the crushed fine ore to be treated with the least possible amount of sulfuric acid and then roasting the moistened ore in a muffle furnace at a temperature of about 500° C. for a considerable period of time, say a few hours. The resulting product shows a large amount of soluble nickel and a relatively small amount of soluble iron.

Having got the nickel (and a certain amount of alumina and little iron) into solution, the sulfate solution is subjected to a precipitation treatment, preferably as follows: The solution is passed in a dilute state through carbonate of lime, that is, crushed limestone. The limestone should be kept in motion so as to remove from it by abrasion the precipitate which tends to adhere to it as a coat in such a way as to prevent its contact with the solution. This can readily be done by placing the limestone in a trommel or basket and causing the same to revolve slowly while immersed to about one-third of its diameter in the bath. This neutralizes any free acids and precipitates calcium sulfate, formed by the limestone and sulfuric acid, which is insoluble. After the free acid is neutralized the process should be stopped, and the solution removed to another vessel containing limestone. Such further treatment with limestone precipitates the alumina, and toward the end of that treatment begins to precipitate the iron. If there is sufficient iron in the solution to make it desirable to save it, the solution can again be removed to another vessel containing limestone where the precipitation of the iron proceeds. Ordinarily, there is not enough iron to make this worth while and the precipitation of iron may therefore usually be allowed to proceed after the precipitation of the alumina in the same vessel. At the end of the precipitation of the alumina and iron, the nickel will begin to be precipitated and the process must again be stopped or the nickel will come down with the other precipitates. At this point the solution is again removed to another vessel in which the nickel, or nickel and manganese, is precipitated. For this purpose it is preferable to use soda ash, or other base material which forms a soluble sulfate, rather than calcium carbonate, so as not to get any calcium sulfate mixed with the precipitate. This nickel precipitation may be sold as a final product, or it may be redissolved in a small amount of suitable solvent such as sulfuric acid, or a solution of ammonium or potassium sulfate in sulfuric acid, to form an electrolyte from which pure metallic nickel can be precipitated by an electric current. With this procedure the manganese, if present, will be recovered as a pure dioxid from the anode pole, the nickel being precipitated as a metal on the cathode pole. Since the precipitates will contain little, if any, other material, the electrolyte can be used for a long period of time, further quantities of the precipitate being added as the precipitation progresses. Or, as an alternative, instead of precipitating nickel and manganese, if present, with soda ash or other base, the purified solutions may be directly electrolyzed, having been first concentrated by heat, if desirable. In this event, the same products will be secured as when the nickel and manganese, if present, are first precipitated and then dissolved in the small amount of electrolyte. Where fuel for evaporation is cheap and soda ash expensive this course will be preferable, but when reverse conditions occur precipitation followed by solution to form the strong electrolyte will be preferable.

Carbonate of lime has been mentioned as a suitable reagent for precipitation on account of its cheapness, but any other base material, such as soda ash, sodic hydrate (caustic soda) or ammonia, might be used. When lime is used the precipitate will be adulterated with calcium sulfate. Portions of the precipitates, however, will contain sufficient alumina to form a valuable by-product for the manufacture of alum, for use in softening boiler water, or for the manufacture of pure aluminum oxid used in making aluminum or for other uses. The precipitates can be made more pure by using a base which has soluble sulfate such as soda ash. Whether to use one agent or another will depend upon local conditions, the value of the by-products, and the desirability of different degrees of purity of the same.

I claim:

1. The method of recovering nickel from oxidized or silicate nickel-bearing ores, which comprises mixing the ore with a small proportion of sulfur-bearing material such as pyrite, and roasting the mixture in its raw state in a suitable furnace at such temperature and for such time that a relatively large amount of the nickel is made soluble while a relatively small amount of the gangue is made soluble.

2. The method of recovering nickel from an oxidized or silicate nickel-iron ore, which comprises mixing the ore with a small proportion of sulfur-bearing material such as pyrite, and roasting the mixture in its raw state in a suitable furnace at such temperature and for such time that a relatively large amount of the nickel is made soluble while a relatively small amount of the iron is made soluble.

3. The method of making the nickel in a nickel-iron ore soluble, which consists in mixing the ore with a small proportion of sulfur-bearing material such as pyrite, and roasting the mixture in its raw state in a suitable furnace at a temperature of from 400° C. to 500° C. for one hour or more.

4. The method of making the nickel in a nickel-iron ore soluble, which consists in mixing the ore with a small proportion of sulfur-bearing material such as pyrite, and roasting the mixture in its raw state in a suitable furnace at a temperature of about 460° C. for about four hours.

5. The method of making the nickel and alumina in an oxidized or silicate ore containing nickel, alumina and iron, soluble, which consists in mixing the ore with a small proportion of sulfur-bearing material such as pyrite, and roasting the mixture in its raw state in a suitable furnace at such temperature and for such time that a relatively large amount of the nickel and alumina is made soluble while a relatively small amount of the iron is made soluble.

6. The method of recovering nickel from an oxidized or silicate nickel-iron ore, which comprises mixing the ore with a small proportion of sulfur-bearing material such as pyrite, roasting the mixture in its raw state in a suitable furnace at such temperature and for such time that a relatively large amount of the nickel is made soluble while a relatively small amount of the iron is made soluble, thereafter dissolving the nickel and leaving the iron as a residue, and thereafter precipitating the nickel from the solution.

7. The method of removing nickel as a by-product and also recovering alumina from an oxidized or silicate aluminous nickel-iron ore, which consists in mixing the ore with a small proportion of sulfur-bearing material such as pyrite, roasting the mixture in its raw state in a suitable furnace at such temperature and for such time as to render the nickel and alumina soluble while leaving the iron insoluble, thereafter dissolving the nickel and alumina and leaving the iron as a residue, and thereafter precipitating the alumina and the nickel from the solution.

8. The method of recovering nickel and manganese as by-products from an oxidized or silicate iron ore containing the same, which consists in mixing the ore with a small proportion of sulfur-bearing material such as pyrite, roasting the mixture in its raw state in a suitable furnace at such temperature and for such time as to render the nickel and manganese soluble while leaving the iron insoluble, thereafter dissolving the nickel and manganese and leaving the iron as a residue, and thereafter precipitating the nickel and manganese from the solution.

9. The method of treating nickel-iron ore which consists in subjecting the raw ore to a preliminary roasting treatment to render the nickel more soluble, thereafter treating the material with a hot solvent, in which the iron is less soluble and the nickel is more soluble than in a cold solvent, and thereafter precipitating nickel from the solution, leaving the iron as a residue.

Signed by me at Boston, Massachusetts, this twentieth day of August, 1915.

FREDERIC A. EUSTIS.